(12) United States Patent
McGuinness

(10) Patent No.: US 8,061,268 B1
(45) Date of Patent: Nov. 22, 2011

(54) TORTILLA COOKING APPARATUS

(76) Inventor: Eugene McGuinness, Oceanside, CA (US)

( * ) Notice: Subject to any disclaimer, the term of this patent is extended or adjusted under 35 U.S.C. 154(b) by 483 days.

(21) Appl. No.: 11/742,869

(22) Filed: May 1, 2007

(51) Int. Cl.
*A47J 37/10* (2006.01)
*A47J 43/18* (2006.01)

(52) U.S. Cl. .................................. 99/422; 99/426

(58) Field of Classification Search .............. 99/426, 99/433, 439, 372, 422; D7/504
See application file for complete search history.

(56) References Cited

U.S. PATENT DOCUMENTS

| | | | |
|---|---|---|---|
| 2,627,222 A | 9/1950 | Luna | |
| 2,570,374 A * | 10/1951 | Pompa | 99/416 |
| 3,555,993 A | 1/1971 | Garcia | |
| 3,745,911 A | 7/1973 | Kennedy | |
| 4,517,887 A | 5/1985 | Childress | |
| 4,535,688 A * | 8/1985 | Bentson | 99/353 |
| 4,896,820 A | 1/1990 | Harrington | |
| 5,236,727 A | 8/1993 | Huston | |
| 5,400,704 A | 3/1995 | Huston | |
| 5,487,330 A | 1/1996 | Mooney | |
| 5,628,245 A | 5/1997 | Baze | |
| 2006/0117963 A1 * | 6/2006 | Schneider et al. | 99/403 |

* cited by examiner

*Primary Examiner* — Sang Paik
(74) *Attorney, Agent, or Firm* — Larkin Hoffman Daly & Lindgren Ltd.; Jose W. Jimenez

(57) ABSTRACT

A device for cooking tortilla shells evenly and to create a U-shape for tacos or bowl-shape for tostadas. For tacos, the device has one shaping member with a top, a bottom, a plurality of vertically disposed peaks from bottom to top, and a plurality of valleys adjacent to each of the peaks. A plurality of apertures are on each of the peaks the purpose of which is to allow full circulation of microwaves on the seated surface of a tortilla shell placed on this shaping member. A two-piece cooking device has two similarly configured rounded shaping members each with a flat top and a downward extending side wall. The top and side walls have a plurality of apertures. A tortilla is placed in between the two shaping members and heated in a microwave oven. Such cooking causes the tortilla shell to retain the bowl-like shape of the two shaping members.

10 Claims, 3 Drawing Sheets

TORTILLA COOKING APPARATUS

CROSS REFERENCES TO RELATED APPLICATIONS

None.

STATEMENT REGARDING FEDERALLY-SPONSORED RESEARCH OR DEVELOPMENT

None.

BACKGROUND

This tortilla cooking device of this present disclosure relates to an improvement in cooking tortillas, and more particularly to cooking tortillas in a more healthy fashion and shaping them into pre-formed taco shells and pre-formed tortilla-bowls.

Eating and cooking tortillas, corn or flour, in their various forms be that as a taco, an enchilada, a tostada, a burrito, or any combinations of those and other forms of Mexican foods, has become extremely popular. So popular that such is no longer limited to speciality Mexican restaurants. Many non-Mexican themed fast-food establishments have also embraced the tortilla in its many forms.

Many large-chain supermarkets stock and sell various forms of tortilla shells for the home shopper. Such tortilla shells may be of the relatively fresh uncooked or partially cooked variety, pre-cooked or pre-formed variety, crisp variety, and the like. Pre-cooked and preformed may take the shape of a conventional U-shaped taco shell to a fancy bowl-shape in which to place a salad, guacamole, frijoles, or any other such treats or combinations thereof.

Uncooked tortilla shells are not generally suited for most Mexican-related meals. The most well recognized means of cooking tortilla shells by a home user are by frying the soft tortilla shell in a frying pan having a suitable shortening in it. Frying for a short period of time will render the cooked shell pliable. Frying for longer periods will render the cooked shell crisp and brittle. How fried and for how long will all depend on the individual tastes of the end user. For those preferring the crisp shell over the softer shell, cooking the tortilla shells is difficult. One must cook them in the oil and shape them while cooking until the desired shaped is accomplished. All the while during this cooking process, the user must be careful to create and maintain the desired shape while cooking and not to break the tortilla shell in the process.

Many innovations in tortilla-cooking devices and utensils have been made over the years due in large part to the rising popularity of foods involving the use of tortilla shells. The Information Disclosure Statement accompanying this current application illustrates the more pertinent of such innovations.

Health-conscious dictates frying with shortenings and oils having lower fats and other unhealthy ingredients. Some have event taken to baking the tortilla shells to their liking thereby eliminating any undesirable qualities occasioned by use of any shortening or oil. Baking, however, is more time-consuming and consumes considerable energy in the process. Cooking tortilla shells in the microwave oven makes it extremely difficult to form and generally tends to render the cooked shell soggy and unappealing. If the tortilla shell is of the flour variety, in addition, it will blister and generally deform.

None of the innovations uncovered have been as innovative as the tortilla cooking device of this present disclosure which, by using the microwave oven, can cook any variety of tortilla shells into the most commonly desired shapes to produce a more healthy and edible tortilla shell than previously capable. All this while preventing deformation and in the process minimizing the blistering effect as many of the flour variety are prone to do if cooked with any other cooking device in the microwave oven.

The tortilla cooking device of this present disclosure directs microwave air flow in such a manner as to more evenly and fully cook the tortilla shell and limit blistering especially when cooking flour tortilla shells for tostada bowls. The mold for cooking tortilla shells into taco shells and the mold for cooking tortilla shells into tostada bowls are slightly different but are interchangeable for use with the same base. In short, the tortilla cooking device of this present disclosure is extremely easy to use, simple to manufacture, and extremely versatile.

The foregoing has outlined some of the more pertinent objects of the tortilla cooking device of this present disclosure. These objects should be construed to be merely illustrative of some of the more prominent features and applications of the tortilla cooking device of this present disclosure. Many other beneficial results can be attained by applying the disclosed tortilla cooking device of this present disclosure in a different manner or by modifying the tortilla cooking device of this present disclosure within the scope of the disclosure. Accordingly, other objects and a fuller understanding of the tortilla cooking device of this present disclosure may be had by referring to the summary of the tortilla cooking device of this present disclosure and the detailed description of the preferred embodiment in addition to the scope of the tortilla cooking device of this present disclosure defined by the claims taken in conjunction with the accompanying drawings.

SUMMARY

The above-noted problems, among others, are overcome by the tortilla cooking device of this present disclosure. Briefly stated, the tortilla cooking device of this present disclosure contemplates a cooking device for tortilla shells to evenly cook and shape the tortilla shells into U-shapes for tacos or into bowl shapes for tostadas. The device has a first shaping member with a top, a bottom, a plurality of vertically disposed peaks from its bottom to its top, and a plurality of valleys adjacent to each said plurality of vertically disposed peaks. A plurality of apertures are on each of the peaks the purpose of which is to allow full circulation of microwaves on the seated surface of a tortilla shell placed on the first shaping member.

The first shaping member has one or more registration pegs which fit into a base for removably attaching this first shaping member to the base and, with tortilla thereon, placing the cooking device into a conventional microwave oven for heating and cooking with microwaves.

Therefore, after the first shaping member is attached and secured to the base a tortilla is draped over the top of the first shaping member thereby forming a defined shape. The cooking device is the placed into a conventional microwave for cooking the tortilla to any desired flexibility, or crispiness causing the tortilla to retain its crisp defined shape.

A two-piece cooking device has a first rounded shaping member with a flat and a downward extending side wall therearound having alternating peaks and valleys. The top and side wall has a plurality of apertures. A second, but slightly larger, shaping member is similarly configured such that it contour-fits over the first shaping member leaving a gap between the two shaping members adapted to accommodate a tortilla shell. The side wall of each shaping member has registration pegs adapted to fit into the base.

In operation, the first smaller shaping member is set into the base, a tortilla shell is draped over the first shaping member. The second shaping member is placed over the tortilla shell and its registration pegs are set into the base. The cooking device with tortilla shell sandwiched in between the two shaping members is placed into a conventional microwave oven and heated and cooked to desired flexibility or crispness. The longer the tortilla shell is cooked, the more crisp it becomes thereby retaining the shape presented by the shaping members.

The foregoing has outlined the more pertinent and important features of the tortilla cooking device of this present disclosure in order that the detailed description that follows may be better understood so the present contributions to the art may be more fully appreciated. Additional features of the tortilla cooking device of this present disclosure will be described hereinafter which form the subject of the claims. It should be appreciated by those skilled in the art that the conception and the disclosed specific embodiment may be readily utilized as a basis for modifying or designing other structures and methods for carrying out the same purposes of the tortilla cooking device of this present disclosure. It also should be realized by those skilled in the art that such equivalent constructions and methods do not depart from the spirit and scope of the tortilla cooking device of this present disclosure as set forth in the appended claims.

BRIEF DESCRIPTION OF THE DRAWINGS

For a fuller understanding of the nature and objects of the tortilla cooking device of this present disclosure, reference should be had to the following detailed description taken in conjunction with the accompanying drawings in which.

DETAILED DESCRIPTION

Figure 1:
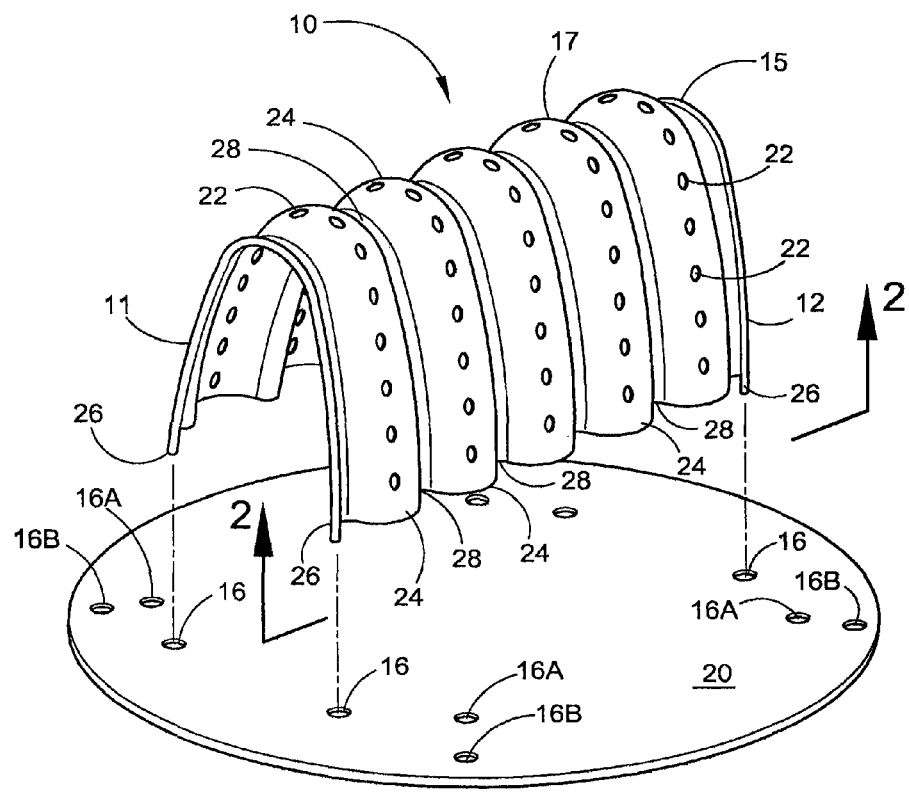
FIG. 1 is a perspective view of a first embodiment of the tortilla cooking device as used for cooking a shaping tortillas into taco shells illustrating its vertically disposed alternating wave-like peaks and valleys.

Referring now to the drawings in detail and in particular to FIG. 1, reference character 10 generally designates a preferred embodiment of the tortilla cooking device of this present disclosure. This device 10 is best suited for cooking tortilla shells shaped for tacos. It has a shaping member 15 onto which a tortilla shell is draped and a base plate 20 for receiving the shaping member 15, with tortilla shell, and placing into a conventional microwave oven for cooking.

This shaping member 15 of this embodiment is an inverted U-shape. It has a first side 11 and a second side 12 the tops of which are radially connected to each other thereby forming the inverted U-shape as the curved top 17. Running from the bottom of the first side 11 and curvilinearly over the top 17 and down to the bottom of the second side 12 are a plurality of vertically disposed wave-like peaks 24. The peaks 24 are relatively parallel to each other. In between each adjacent peak 24 is a valley or channel 28.

Figure 2:
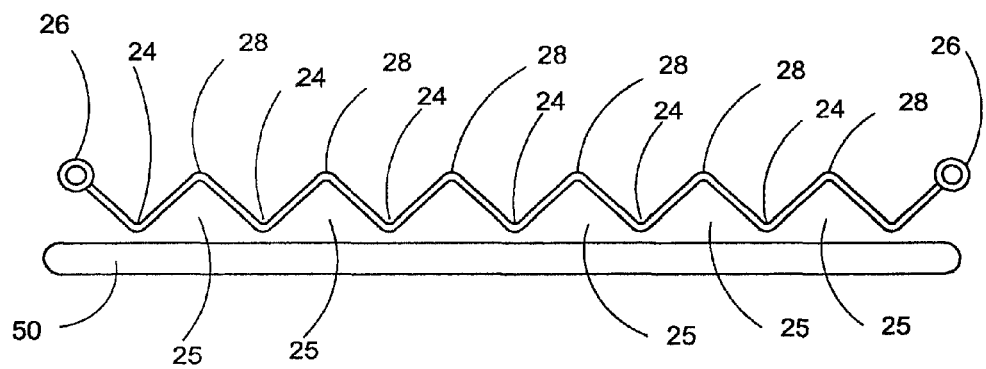
FIG. 2 as taken on line 2-2 of FIG. 1 is a detailed view of the vertically disposed pointed crests or peaks and valleys of the shaping member of the tortilla cooking device.

Registration members 26 are on the bottom of each side 11, 12. The registration members 26 align with and fit into the mating apertures 16 on said base 20. A plurality of vents or apertures 22 are on each peak 24. As a tortilla shell 50 is draped over the shaping member 15 it will rest on the peaks 24 at the top 17 and be adjacent to the peaks 24 on each side 11, 12. As best illustrated in FIG. 2, a flue-like structure 25 is formed in the space defined by each valley 28 in between two adjacent peaks 24.

Though the apertures 22 are shown to be on the peaks 24, the apertures 22 may be on the sides of the peaks 24 on in the valleys 28 or both. The respective peaks and valleys also may be rounded, pointed, flat, or any combinations thereof.

Consequently, as the tortilla shell 50, as draped over tortilla cooking device of this present disclosure, cooks in a microwave oven, microwaves and air will vent up through the flue-like structures 25 and through and out of the plurality of apertures 22 in the peaks 24. This plurality of apertures 22 and flue-like structures 25 causes the heating components of the microwaves to circulate evenly on the inside of the tortilla shell [that portion resting on and adjacent to the peaks 24].

The entire inner portion of the tortilla shell 50 is so heated and cooked to virtually even perfection to the desired state of the user [from pliable to crisp or any variation in between]. If cooked to a crisp state, the cooked tortilla shell 50 will not only be properly and evenly cooked, but will retain the shape of the shaping member 15 when removed. When the tortilla shell 50 is then inverted, it will resemble the familiar U-shape suited for a taco and acceptance of fillings of the user's choice.

Figure 3:
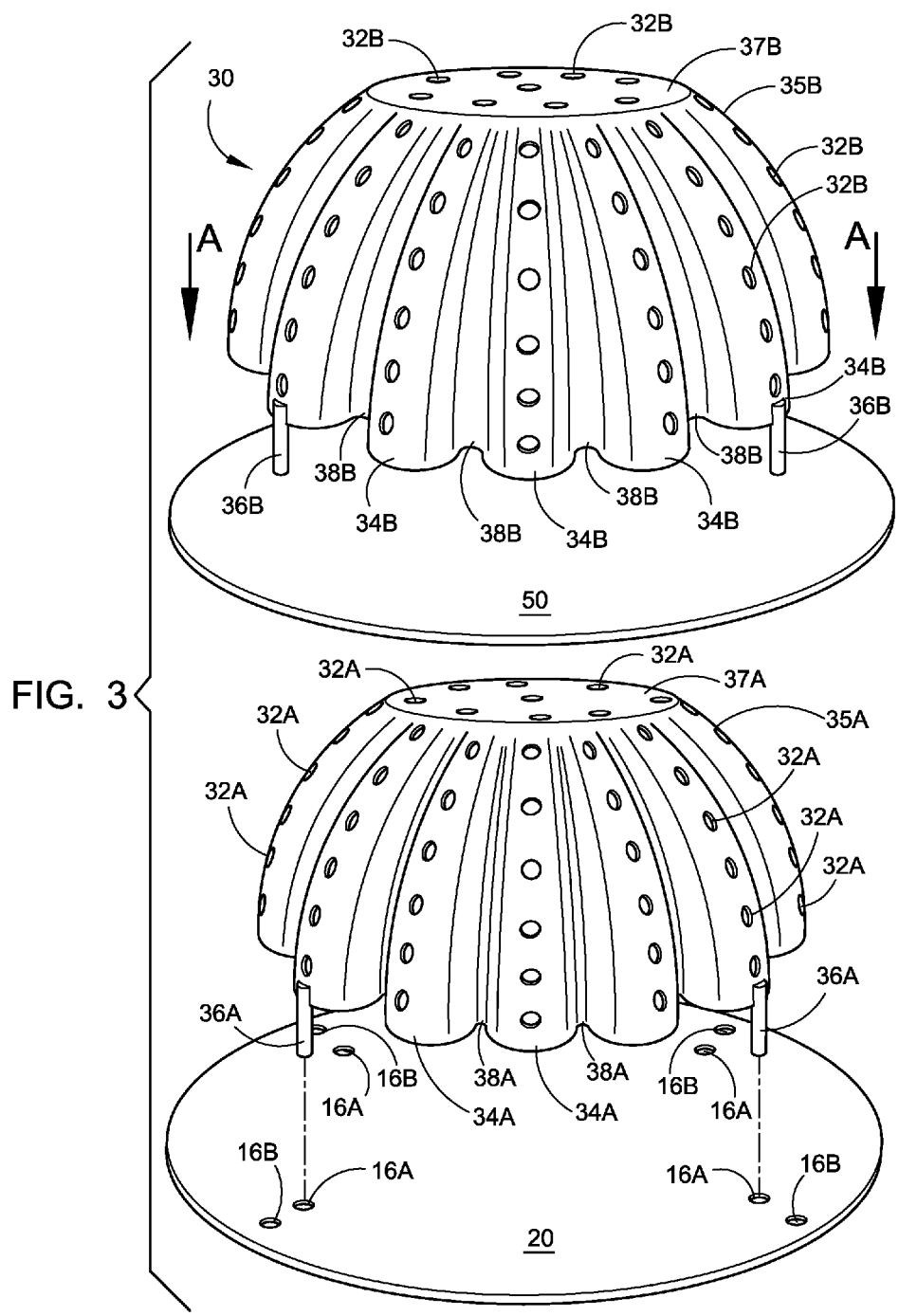
FIG. 3 is a perspective of a second embodiment of the tortilla cooking device as used for cooking and shaping tortillas into bowls.
Figure 4:
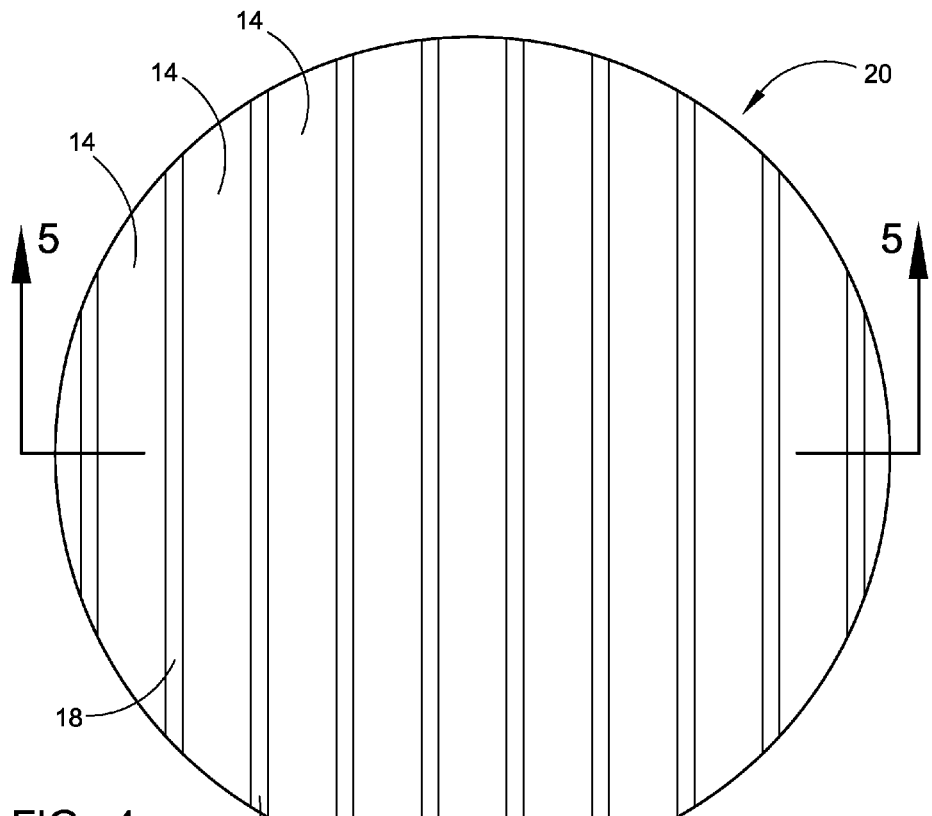
FIG. 4 is a plan view of the base plate.
Figure 5:
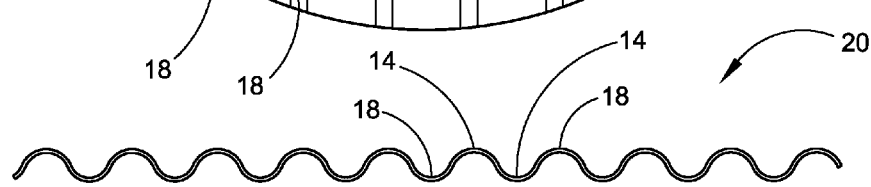
FIG. 5 is a cross-section view as taken on line 5-5 of FIG. 4 depicting one embodiment of the configuration of the peaks and valleys of the base plate.
Figure 6:
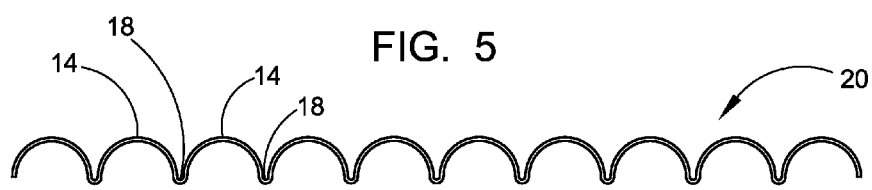
FIG. 6 is a cross-section view as taken on line 5-5 of FIG. 4 depicting a second embodiment of the configuration of the peaks and valleys of the base plate.
Figure 7:
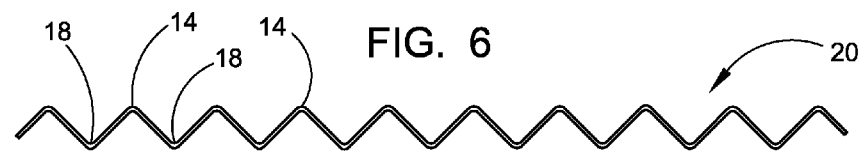
FIG. 7 is a cross-section view as taken on line 5-5 of FIG. 4 depicting a third embodiment of the configuration of the peaks and valleys of the base plate.

FIG. 3 illustrates a second embodiment of the tortilla cooking device of the present disclosure 30. The first shaping member 35A is substantially round and has a relatively flat top 37A with a plurality of apertures 32A thereon. This embodiment of the first shaping member 35A also has a plurality of alternating peaks 34A and valleys 38A running from its bottom to its top. Consequently, there is a valley 38A in between each adjacent peak 34A. As with the previously described embodiment, the peaks 34A may be curvilinear or have defined angles; i.e., pointed peaks as illustrated in FIG. 2. The first shaping member 35A also has a plurality of apertures 32A on its peaks 34A.

On the bottom of this first shaping member 34A are one or more registration pegs 36A which are adapted to fit into corresponding mating apertures 16A on the base plate 20. In use, therefore, a user would align the pegs 36A of this first shaping member 34A over the mating apertures 16A of the base plate 20 and insert them threat. Such will receive and retain in place the first shaping member 35A on the base plate 20.

This embodiment also has a second shaping member 35B which is substantially round and also has a relatively flat top 37B with a plurality of apertures 32B thereon. This embodiment of the second shaping member 35B also has a plurality of alternating peaks 34B and valleys 38B running from its bottom to its top. Consequently, there is a valley 38B in between each adjacent peak 34B. As with the previously described embodiment, the peaks 34B may be curvilinear or have defined angles; i.e., pointed peaks as illustrated in FIG. 2. The second shaping member 35B also has a plurality of apertures 32B on its peaks 34B.

On the bottom of this second shaping member 34B are one or more registration pegs 36B which are adapted to fit into corresponding mating apertures 16B on the base plate 20. In use, therefore, a user would align the pegs 36B of this second shaping member 34B over the mating apertures 16B of the base plate 20 and insert them thereat. Such will receive and retain in place the second shaping member 35B on the base plate 20.

As can be seen and as is illustrated, each shaping member 35A, 35B is similarly configured except that the first shaping member 35A is slightly smaller than the second shaping member 35B with the second shaping member 35B being contour-fittable over the first shaping member 35A but leaving a gap between the two such that the gap will accommodate a tortilla shell therebetween. The gap, therefore, generally should be uniform from the upper outside surface area of the first shaping member 35A to the inside surface area of the second shaping member 35B.

To accommodate tortilla shells for the purpose intended, this gap should range from approximately one-sixteenth of an inch to approximately one-fourth of an inch. Therefore, after the first shaping member 35A is inserted into the base plate as described above, a tortilla shell 50 is placed over it. Next the second shaping member 35B is placed over the tortilla shell 50 in the direction of Arrow A. This forces the tortilla shell 50 to adopt the shape of the two shaping members 35A, 35B in between which it has been placed.

This two-piece cooking device 30 is then placed into a microwave oven and microwave-cooked. Similarly as discussed for the previously described the taco-forming cooking device 10, due to the apertures 32A, 32B, the microwaves circulate throughout the two shaping members 35A, 35B throughout the undersurface of the second shaping member 35A and the upper surface of the first shaping member 35A and all surface areas of the imbedded tortilla shell 50. This configuration of the two shaping members 35A, 35B causes the tortilla shell to cook evenly throughout and adopt the shape the two shaping members 35A, 35B force upon it.

After the desired cooking time, depending on how crisp the user desires the tortilla shell 50 to be, the cooking device 30 is removed from the microwave oven. The second shaping member 35B is removed and the tortilla shell 50 may be separated from the first shaping member 35A. Inverting the cooked and shaped tortilla shell 50 reveals an edible tostada bowl having a relatively flat bottom and well-suited for receiving any desired food items therein.

Although in this embodiment, as before, the apertures 32A, 32B are shown to be on the peaks 34A, 34B, the apertures 32 may also be on the sides of the peaks 34A, 34B on in the valleys 38A, 38B or both or any combination thereof. The respective peaks and valleys also may be rounded, pointed, flat, or any combinations thereof.

FIGS. 4 through 7 illustrate additional details and structure of the base plate 20. As illustrated in these figures, the base plate 20 also may have a plurality of peaks 14 with alternating valleys 18 thereon, each of which are horizontally disposed on the top of the base plate 20. In this regard, and as with the peaks 24, 34A, 34B and valleys 28, 38A, 38B described for the shaping members 15, 35A, 35B, the respective peaks and valleys may be rounded [FIGS. 5-6], may be pointed [FIG. 7], or may be flat [FIG. 4].

The base plate 20 having these peaks and valleys render it well suited for cooking tortilla shells into tortilla chips. A tortilla would first by cut into desired shapes [triangular for instance], placed on the base plate 20, the base plate 20 with cut-up tortilla pieces placed into a microwave oven and cooked to desired crispness. The peaks and valley on the base plate 20 serve to better circulate the microwaves for even cooking of the cut-up shells into uniformly crisp tortilla chips.

The present disclosure includes that contained in the present claims as well as that of the foregoing description. Although this tortilla cooking device of this present disclosure has been described in its preferred forms with a certain degree of particularity, it is understood that the present disclosure of the preferred forms has been made only by way of example and numerous changes in the details of construction and combination and arrangement of parts and method steps may be resorted to without departing from the spirit and scope of the tortilla cooking device of this present disclosure. Accordingly, the scope of the tortilla cooking device of this present disclosure should be determined not by the embodiment[s] illustrated, but by the appended claims and their legal equivalents.

Applicant[s] have attempted to disclose all the embodiment[s] of the tortilla cooking device of this present disclosure that could be reasonably foreseen. It must be understood, however, that there may be unforeseeable insubstantial modifications to tortilla cooking device of this present disclosure that remain as equivalents and thereby falling within the scope of the tortilla cooking device of this present disclosure.

What is claimed is:

1. An apparatus for use in cooking flatbread in a microwave oven, the apparatus comprising:
    a body having a length, a width, and a height, the body including alternating ridges and valleys disposed along at least a portion of the length of the body and extending transverse to the length of the body, each of the ridges and each of the valleys having two sides and a connecting portion connected to the two sides;
    wherein the body has a non-uniform cross-sectional perimeter size along the length of the body, with a first cross-section transverse to the length of the body through one of the ridges along a peak of the ridge having a first substantially U-shaped perimeter of a first size, and a cross-section transverse to the length of the body through one of the valleys along its trough having a second substantially U-shaped perimeter of a second size, the first size being larger than the second size.

2. The apparatus of claim 1 wherein each of the ridges provides wholly within the ridge at least one aperture configured to allow steam to pass from the flatbread, when disposed on the body and cooked in a microwave oven, through the at least one aperture.

3. The apparatus of claim 1 wherein each of the ridges provides a plurality of apertures disposed along a length of the ridge.

4. The apparatus of claim 3 wherein each of the ridges provides the apertures along the peak of the ridge.

5. The apparatus of claim 1 wherein the body consists of microwave-safe material.

6. The apparatus of claim 1 wherein the substantially U-shaped body has a base portion and two side portions with proximal ends connected to the base portion and distal ends disposed remotely from the base portion, the proximal ends being closer to each other than the distal ends.

7. The apparatus of claim 1 wherein the ridges and valleys extend linearly transverse to the length and parallel to each other.

8. An apparatus for use in cooking a single tortilla in a microwave oven, the apparatus comprising:
- a body having a length, a width, and a height, the body having two sides and a central portion connecting the two sides to receive the single tortilla such that the single tortilla has a substantially U-shaped cross-section transverse to the length of the body when received by the body, the body including alternating ridges and recesses disposed along at least a portion of the length of the body such that the apparatus has a varying cross-sectional size along the length of the body;

wherein the recesses provide channels from the central portion of the body to ends of the sides whereby steam is channeled between the single tortilla and the apparatus away from the single tortilla when the single tortilla is received by the body and cooked in the microwave oven.

9. The apparatus of claim 8 wherein both the ridges and the recesses extend transverse to the length of the body.

10. The apparatus of claim 9 wherein each of the ridges provides within the ridge at least one aperture configured to allow steam to pass from the single tortilla through the apparatus when the single tortilla is disposed on the body and cooked in a microwave oven.

* * * * *